(12) United States Patent
Waldin et al.

(10) Patent No.: US 7,185,332 B1
(45) Date of Patent: *Feb. 27, 2007

(54) MULTI-TIERED INCREMENTAL SOFTWARE UPDATING

(75) Inventors: Ray Soon Waldin, Los Angeles, CA (US); Carey Nachenberg, Northridge, CA (US)

(73) Assignee: Symantec Corporation, Cupertino, CA (US)

(*) Notice: Subject to any disclaimer, the term of this patent is extended or adjusted under 35 U.S.C. 154(b) by 526 days.

This patent is subject to a terminal disclaimer.

(21) Appl. No.: 10/682,644

(22) Filed: Oct. 8, 2003

Related U.S. Application Data

(60) Continuation of application No. 09/469,582, filed on Dec. 22, 1999, now Pat. No. 6,651,249, which is a division of application No. 09/047,949, filed on Mar. 25, 1998, now Pat. No. 6,052,531.

(51) Int. Cl.
*G06F 9/44* (2006.01)
*G06F 9/445* (2006.01)

(52) U.S. Cl. .................. 717/170; 717/171; 717/177

(58) Field of Classification Search ......... 717/168–178
See application file for complete search history.

(56) References Cited

U.S. PATENT DOCUMENTS

| | | | |
|---|---|---|---|
| 3,969,723 A | 7/1976 | Kennicott | |
| 4,558,413 A | 12/1985 | Schmidt et al. | |
| 4,714,992 A | 12/1987 | Gladney et al. | |
| 4,809,170 A | 2/1989 | Leblang et al. | |
| 4,962,532 A | 10/1990 | Kasiraj et al. | |
| 5,155,847 A | 10/1992 | Kirouac et al. | |
| 5,182,806 A | 1/1993 | McKeeman et al. | |
| 5,204,960 A | 4/1993 | Smith et al. | |
| 5,479,654 A | 12/1995 | Squibb | |
| 5,485,575 A * | 1/1996 | Chess et al. | .................. 714/38 |
| 5,495,610 A | 2/1996 | Shing et al. | |
| 5,508,817 A | 4/1996 | Kunigami | |
| 5,519,866 A | 5/1996 | Lawrence et al. | |
| 5,555,346 A | 9/1996 | Gross et al. | |

(Continued)

FOREIGN PATENT DOCUMENTS

EP 0230616 A2 8/1987

(Continued)

OTHER PUBLICATIONS

Bellare, Mihir; Goldreich, Oded; Goldwasser, Shafi; "Incremental Cryptography and Application to Virus Protection", p. 45-56, 1995 ACM, retrieved May 10, 2006.*

(Continued)

*Primary Examiner*—Mary Steelman
(74) *Attorney, Agent, or Firm*—Fenwick & West LLP

(57) ABSTRACT

A software application (110) is updated to a newer version by means of incremental update patches (122). The incremental update patches (122) each contain that information necessary to transform one version of an application to another version. Any version of an application (110) may be upgraded to any other version of the application, through the use of a series of incremental update patches (122). The appropriate incremental update patches (122) are distributed in a multi-tiered manner, such that some update patches (122) update the application (110) by only one version, and others update the application (110) by several versions.

24 Claims, 7 Drawing Sheets

U.S. PATENT DOCUMENTS

| | | | |
|---|---|---|---|
| 5,557,723 A | 9/1996 | Holt et al. | |
| 5,566,335 A | 10/1996 | Nash et al. | |
| 5,574,906 A | 11/1996 | Morris | |
| 5,581,764 A | 12/1996 | Fitzgerald et al. | |
| 5,613,108 A | 3/1997 | Morikawa | |
| 5,619,648 A | 4/1997 | Canale et al. | |
| 5,649,200 A | 7/1997 | Leblang et al. | |
| 5,671,398 A | 9/1997 | Neubauer | |
| 5,673,387 A | 9/1997 | Chen et al. | |
| 5,684,875 A * | 11/1997 | Ellenberger | 482/4 |
| 5,694,616 A | 12/1997 | Johnson et al. | |
| 5,699,275 A | 12/1997 | Beasley et al. | |
| 5,717,923 A | 2/1998 | Dedrick | |
| 5,729,743 A | 3/1998 | Squibb | |
| 5,774,552 A | 6/1998 | Grimmer | |
| 5,781,901 A | 7/1998 | Kuzma | |
| 5,790,856 A | 8/1998 | Lillich | |
| 5,794,210 A | 8/1998 | Goldhaber et al. | |
| 5,799,189 A | 8/1998 | Koser et al. | |
| 5,832,220 A | 11/1998 | Johnson et al. | |
| 5,892,900 A | 4/1999 | Ginter et al. | |
| 5,893,113 A | 4/1999 | McGrath et al. | |
| 5,903,880 A | 5/1999 | Biffar | |
| 5,905,896 A | 5/1999 | Delannoy | |
| 5,909,581 A | 6/1999 | Park | |
| 5,911,048 A | 6/1999 | Graf | |
| 5,917,489 A | 6/1999 | Thurlow et al. | |
| 5,933,647 A | 8/1999 | Aronberg et al. | |
| 5,933,811 A | 8/1999 | Angles et al. | |
| 5,948,058 A | 9/1999 | Kudoh et al. | |
| 5,948,104 A | 9/1999 | Gluck et al. | |
| 5,953,532 A | 9/1999 | Lochbaum | |
| 5,960,204 A | 9/1999 | Yinger et al. | |
| 5,960,411 A | 9/1999 | Hartman et al. | |
| 5,999,967 A | 12/1999 | Sundsted | |
| 6,006,034 A | 12/1999 | Heath et al. | |
| 6,006,242 A | 12/1999 | Poole et al. | |
| 6,035,423 A | 3/2000 | Hodges et al. | |
| 6,052,531 A | 4/2000 | Waldin, Jr. et al. | |
| 6,057,841 A | 5/2000 | Thurlow et al. | |
| 6,073,142 A | 6/2000 | Geiger et al. | |
| 6,081,814 A | 6/2000 | Mangat et al. | |
| 6,088,803 A | 7/2000 | Tso et al. | |
| 6,092,080 A | 7/2000 | Gustman | |
| 6,119,165 A | 9/2000 | Li et al. | |
| 6,138,146 A | 10/2000 | Moon et al. | |
| 6,145,079 A | 11/2000 | Mitty et al. | |
| 6,146,026 A | 11/2000 | Ushiku | |
| 6,147,977 A | 11/2000 | Thro et al. | |
| 6,151,643 A | 11/2000 | Cheng et al. | |
| 6,161,130 A | 12/2000 | Horvitz et al. | |
| 6,161,181 A | 12/2000 | Haynes, III et al. | |
| 6,178,551 B1 | 1/2001 | Sana et al. | |
| 6,185,603 B1 | 2/2001 | Henderson et al. | |
| 6,199,081 B1 | 3/2001 | Meyerzon | |
| 6,260,059 B1 | 7/2001 | Ueno et al. | |
| 6,345,256 B1 | 2/2002 | Milsted et al. | |
| 6,349,407 B1 | 2/2002 | Towfiq | |
| 6,363,415 B1 | 3/2002 | Finney et al. | |
| 6,374,237 B1 | 4/2002 | Reese | |
| 6,418,555 B2 | 7/2002 | Mohammed | |
| 6,421,669 B1 | 7/2002 | Gilmour et al. | |
| 6,460,036 B1 | 10/2002 | Herz | |
| 6,460,050 B1 | 10/2002 | Pace et al. | |
| 6,484,315 B1 | 11/2002 | Ziese | |
| 6,490,587 B2 | 12/2002 | Easty et al. | |
| 6,493,722 B1 | 12/2002 | Daleen et al. | |
| 6,510,552 B1 | 1/2003 | Benayoun et al. | |
| 6,535,894 B1 | 3/2003 | Schmidt et al. | |
| 6,609,196 B1 | 8/2003 | Dickinson et al. | |
| 6,651,249 B2 | 11/2003 | Waldin et al. | |
| 6,654,787 B1 | 11/2003 | Aronson et al. | |
| 6,771,765 B1 | 8/2004 | Crowther et al. | |
| 2001/0018739 A1 | 8/2001 | Anderson et al. | |
| 2002/0007400 A1 | 1/2002 | Pedersen | |
| 2004/0133776 A1 | 7/2004 | Putzolu | |

FOREIGN PATENT DOCUMENTS

| | | |
|---|---|---|
| EP | 0735474 A2 | 10/1996 |
| EP | 0774720 A2 | 5/1997 |
| WO | WO 96/32679 | 10/1996 |
| WO | WO 99/22325 A1 | 5/1999 |
| WO | WO 00/29945 A1 | 5/2000 |
| WO | WO 01/37123 | 5/2001 |

OTHER PUBLICATIONS

Jee, Jieh-Sheng; Hsiang, Jieh; Tsang, Po-Hao, "A Generic Virus Detection Agent on the Internet", p. 210-219, 1997 IEEE, retrieved May 10, 2006.*

Ambriola, Vincenzo; Bendix, Lars; and Ciancarini, Paolo, "The Evolution of Configuration Management and Version Control," Software Engineering Journal, Nov. 1990, pp. 303-310, retrieved from IEEE database, Sep. 24, 2002, U.S.A.

Conradi, Reidar and Westfechtel, Bernhard, "Configuring Versioned Software Products," Department of CS and Telematics, Norwegian Institute of Technology, Trondhiem, Norway, 1996, retrieved from http://citeseer.nj.nec.com/conradi96 on Sep. 24, 2002.

Grundy, et al., "Support For Collaborative, Integrated Software Developement," Proc 95 Software Engineering Environments, Abstract Only, Apr. 1995, U.S.A.

Hedin, Gorel, "Incremental Execution In A Programming Environment Based On Compilation," Proc. Of Nineteenth Hawaii Intl. Conf. On System Sciences, Abstract Only, Jan. 1986, U.S.A.

Hurwitz Group, "Application Management for Distributed Applications," pp. 1-7, Jun. 1998, U.S.A.

Lindsay, Peter; Liu, Yaowei, and Traynor, Owen, "A Generic Model for Fine Grained Configuration Management Including Version Control and Traceability," 1997 IEEE, retrieved from the IEEE database Sep. 24, 2002, U.S.A.

Marimba, "Castanet Infrastructure Suite," Jun. 1998, U.S.A.
Marimba, "Castanet Management Suite," Jun. 1988, U.S.A.
Marimba, "Castanet 3.0 Product Family," Jun. 1998, U.S.A.
Marimba, "Castanet Production Suite," Jun. 1998, U.S.A.

Pocket Soft, ".RTPatch® Professional for Windows, NT, and DOS Binary Update System," pp. 1-6. Jun. 23, 1998, http://www.pocketsoft.com\whtwind.html, U.S.A.

Pollock, Lori, "Incremental Version of Iterative Data Flow Analysis," IEEE Trans Software Eng., v 15, n 12, Abstract Only, Dec. 1989, U.S.A.

Reichenberger, Christoph, "Orthoganal Version Management," Universitat Linz, Institut fur Informatik, Austria, 1989 ACM.

Suk Oh, Am, et al. "An Incremental Update Propagation Scheme For A Cooperative Transaction Model," Proc. 7th Intl. Workshop On Database And Expert Systems Appl, Abstract Only, Sep. 1996, U.S.A.

"User-Friendly Interface for Applying Specific Levels of Coordinated Updates to Software in the Field," IBM Technical Disclosure Bulletin, vol. 31, No. 10, Mar. 1989, Armonk, NY, U.S.A.

U.S. Appl. No. 10/211,827, filed Aug. 2, 2002, Nachenberg.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

"Gold Parser, A Free Multi-Platform Parser Generator", [online] devincook.com [retrieved Oct. 7, 2003] Retrieved from the Internet: <URL: http://www.devincook.com/goldparser/index.htm>.

"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.

U.S. Appl. No. 10/211,827, filed Aug. 2, 2002, Nachenberg.

Cranor, Faith, L., LaMacchia, Brian A., "Spam!" Communications of the ACM, vol. 41, No. 8, pp. 74-83, Aug. 1998.

Keneipp, Ray, Traffic Shaping [Online], May 14, 2001, [retrieved from the Internet on Apr. 27, 2004] Retrieved from the Internet: <URL: Itworld.com—supersite manager—Traffic Shaping http://www.itworld.com/nl/sup_mgr/05142001/>.

ISP-Planet Staff, Slower Spam Would Annoy Spammers [Online] Feb. 20, 2003, [retrieved from the Internet on Apr. 22, 2005]. Retrieved from the Internet: <URL: ISP-Planet—Equipment—Slower Spam Would Annoy Spammers, http://www.isp-planet.com/equipment/2003/spamsquelcher.html>.

Wagner, Mitch, "Tool Users Network Analysis to Fight Spam" [Online] retrieved from the Internet on Apr. 22, 2005 Retreived from the Internet: <URL: Internet Week>E-mail>Tool Uses Network Analysis to Fight Spam> Feb. 13, 2003, http://www.internetweek.com/story/showarticle.jhtml?articleID=6900032>.

PR Newswire, "Spam Squelcher Technology Cuts Costly Impact of Spam on Enterprises and ISPs;" New Product from ePrivcacy Group turns back Spam Attacks with False Positives, [Online] Feb. 11, 2003, [Retrieved from the Internet on May 3, 2004]. Retrieved from the Internet:<URL: PR Newswire Spam Squelcher Technology Cuts Costly Impact of Spam on Enterprises and ISPs http://www.findarticles.com/cf_dls/m4prn/2003_Feb_11/97463210/p1/article.jhtml>.

* cited by examiner

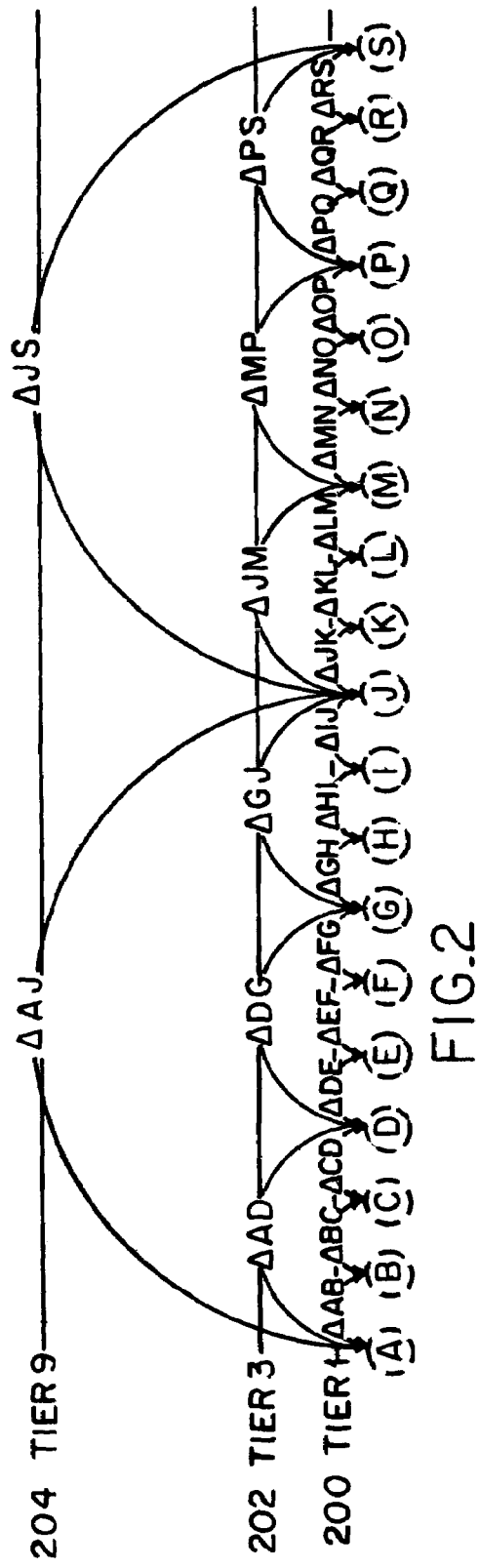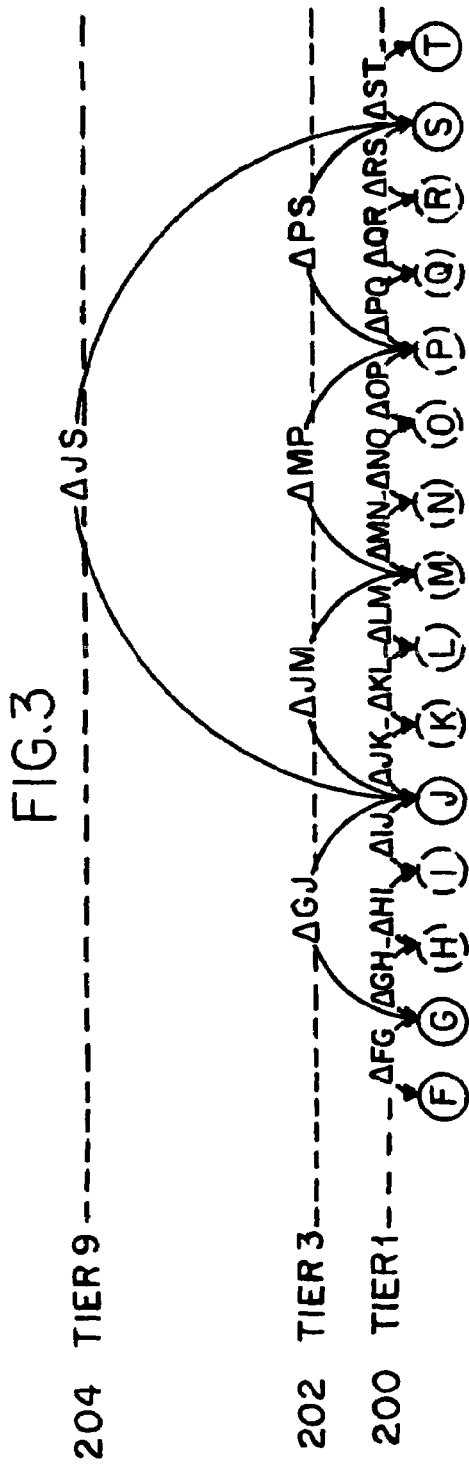
FIG.2
FIG.3

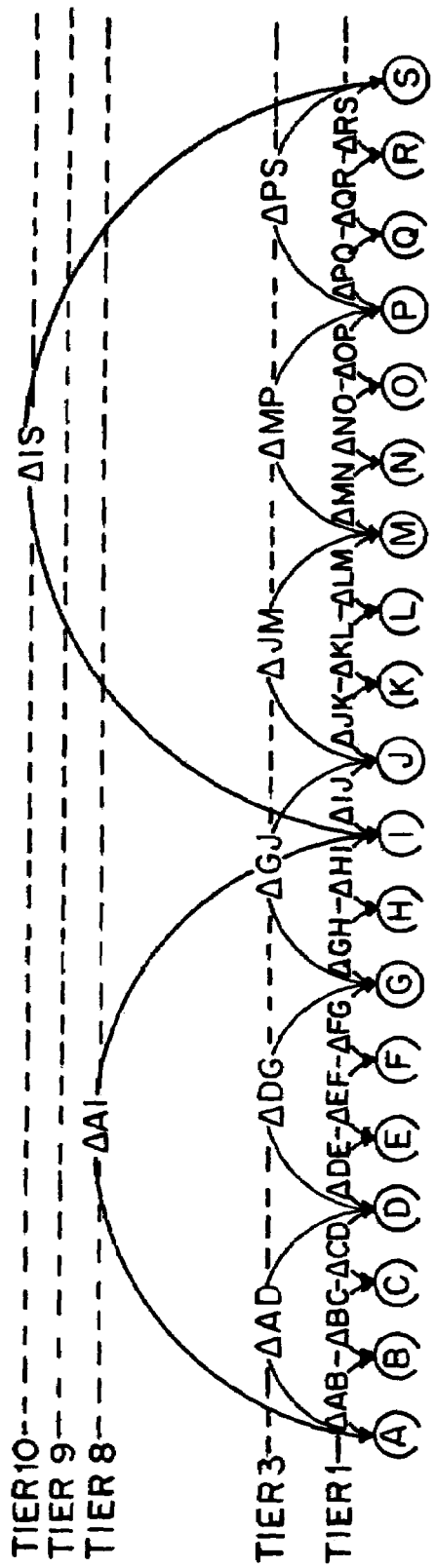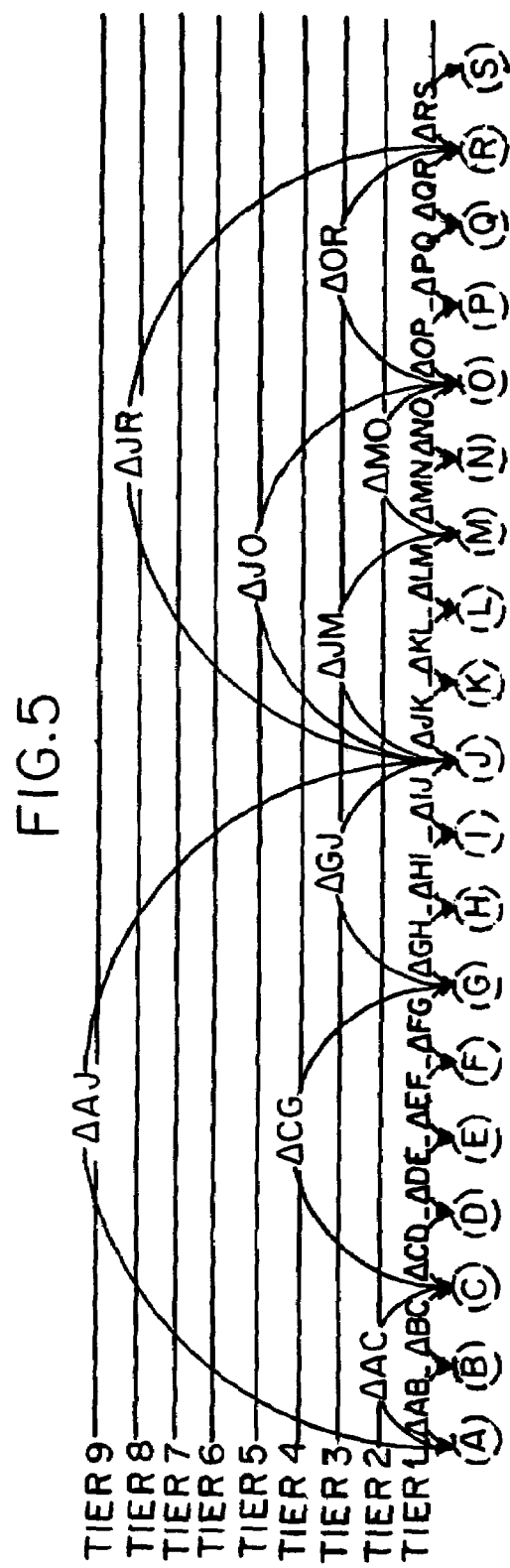
FIG.4
FIG.5

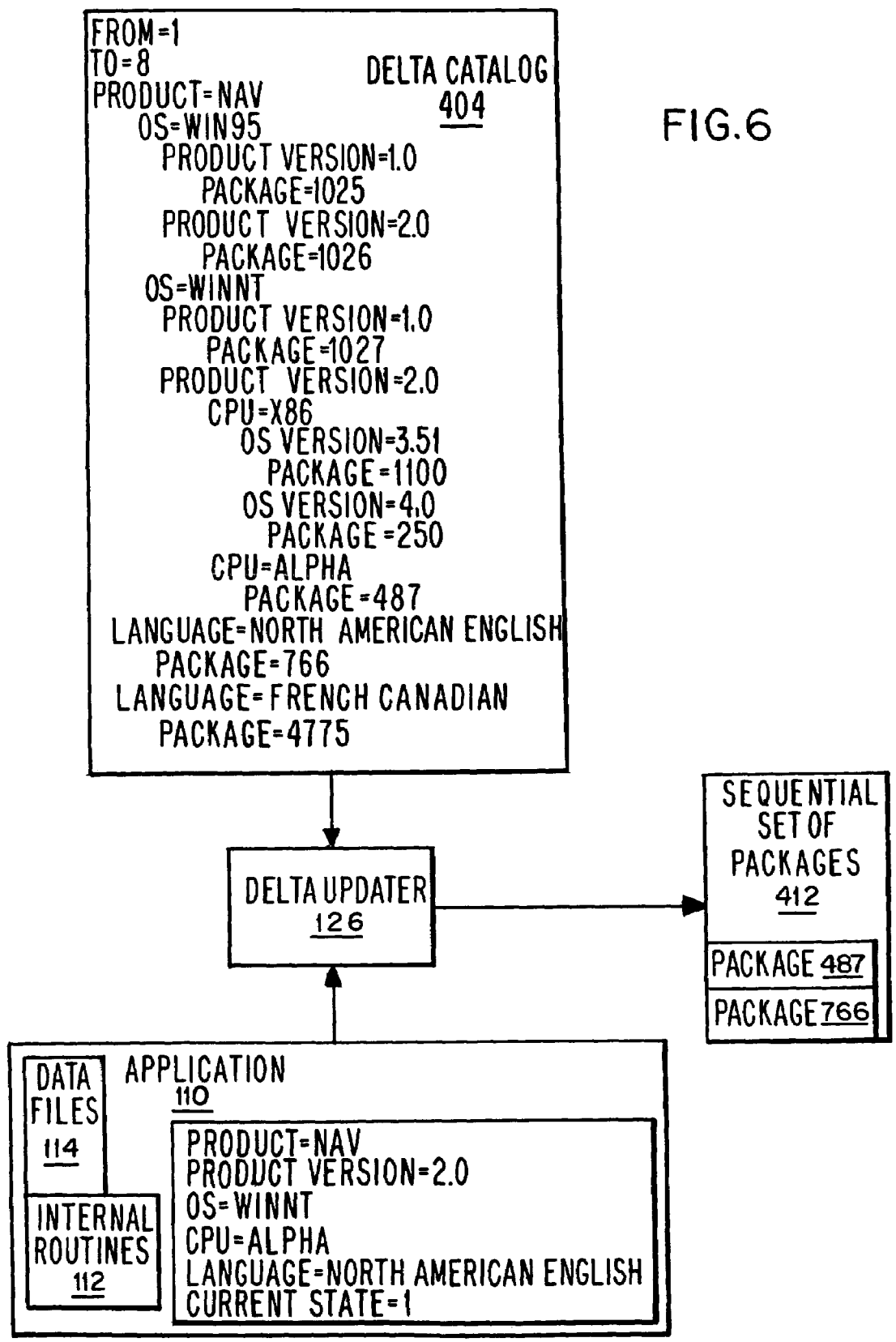

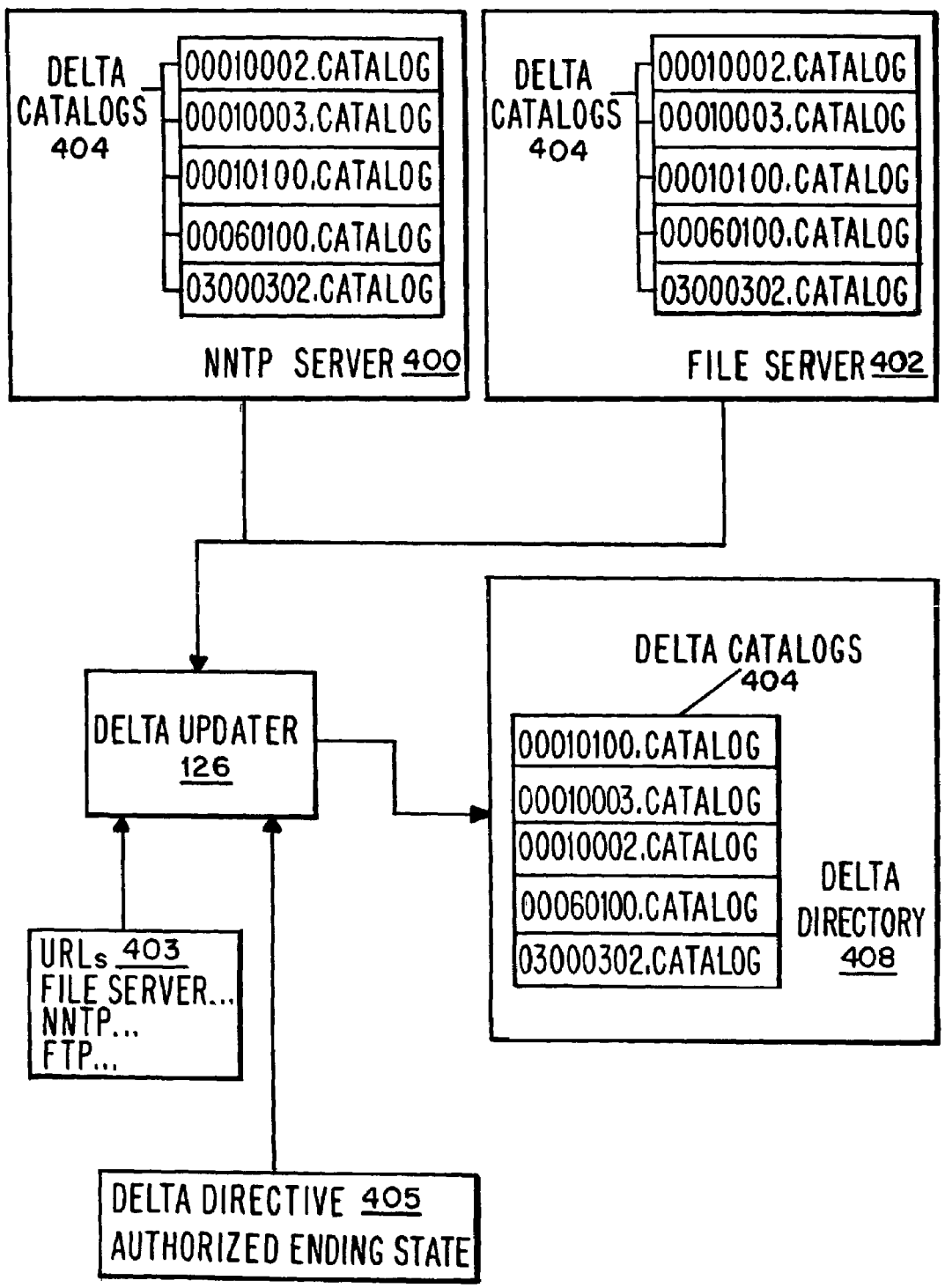

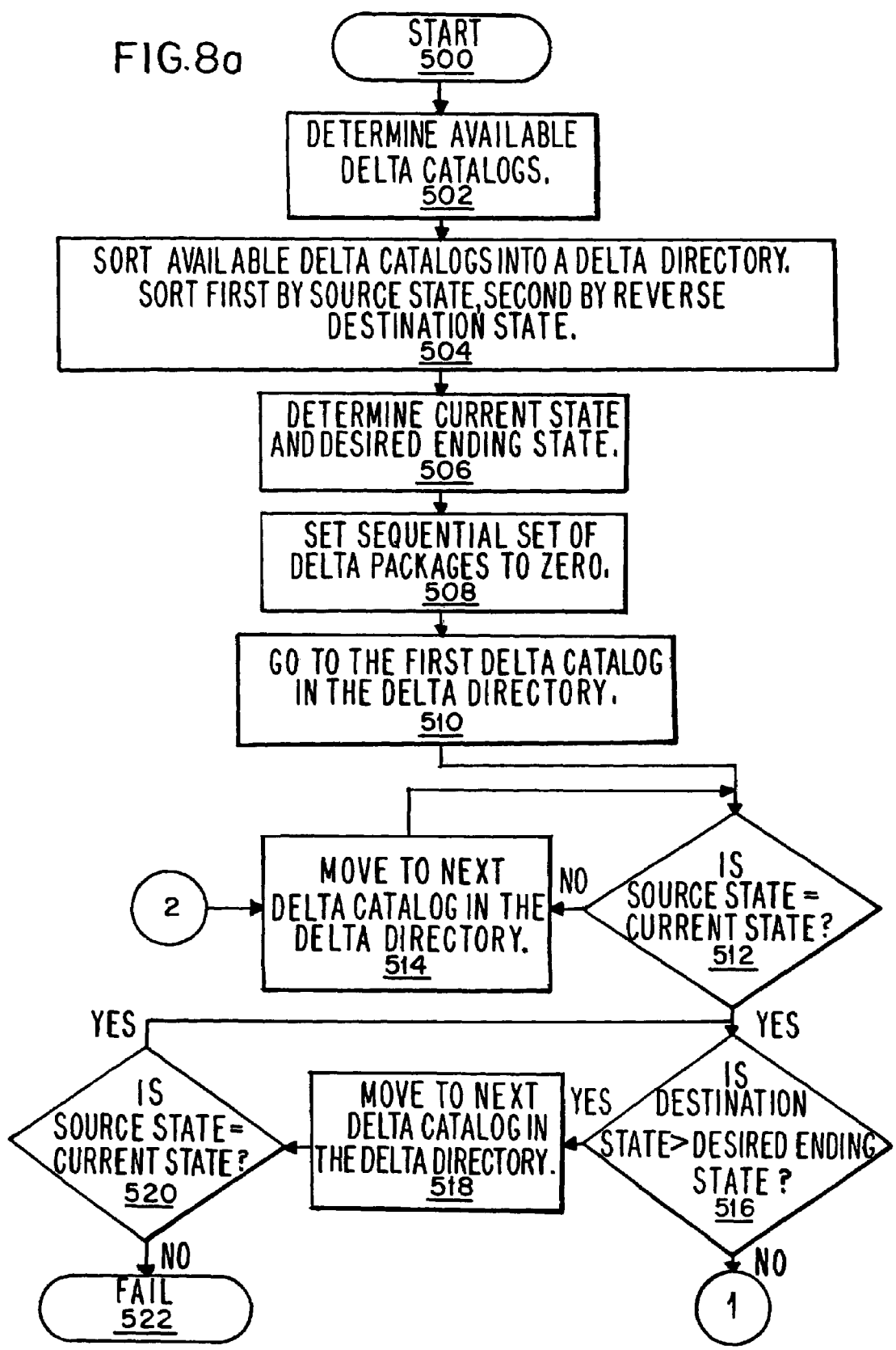

MULTI-TIERED INCREMENTAL SOFTWARE UPDATING

CROSS-REFERENCE TO RELATED APPLICATIONS

The present patent application is a continuation of U.S. patent application Ser. No. 09/469,582 filed Dec. 22, 1999, now U.S. Pat. No. 6,651,249, which is a division of U.S. patent application Ser. No. 09/047,949 filed Mar. 25, 1998, now U.S. Pat. No. 6,052,531.

BACKGROUND OF THE INVENTION

1. Field of the Invention

The present invention relates generally to incremental software updating, and more specifically to a system and method for using an automated, multi-tiered approach to performing incremental software updates.

2. Description of Background Art

Some computer software publishers update their software "applications" (computer programs and data files associated with the programs) frequently. For some types of software applications, such as virus protection software, these updates are particularly frequent. Virus protection software applications are designed to detect computer viruses on a computer system, and may also remove viruses which are found. An example of such a software application is Norton Anti-Virus, published by Symantec Corporation of Cupertino, Calif. Because these virus protection software applications rely on data about specific viruses, and new viruses are constantly being written to avoid current virus detection capabilities, it is necessary to update virus protection software applications on a regular basis to account for the newest viruses. Frequent updating of data files is also necessary for some database publishers, who must put up-to-date information in their databases, and remove obsolete information therefrom. Periodic updating of general software applications to expand capabilities and eliminate "bugs" is also common.

Currently, several methods are used to update software applications. The simplest of these is to distribute one entire software application to replace an older one. This method, the "full update" method, is simple, but expensive and inconvenient. Typically the software is distributed on some type of removable media, such as floppy disks or CD-ROMs, which are costly to produce and distribute. The time an end user must wait for the removable medium to arrive and the time it takes for the software application to install itself on a computer system are inconvenient. This inconvenience is compounded where updates occur frequently. Because of the large size of software applications it is generally not feasible to distribute such updates over computer networks, such as the Internet. When full updates are distributed over the Internet, they often cause such high loads on servers that other users suffer slow-downs on the network, and the servers have trouble meeting the demands.

In order to bypass many of the problems associated with this type of software updating, some software publishers distribute "incremental updates." These updates do not contain entire software applications, but rather only that information necessary to transform a given version of a software application to a newer version. Among the methods available to perform such incremental software updating is binary patching, performed by programs such as RTPatch, published by Pocket Soft, Inc. A binary patcher replaces only those binary bits of a software application which are different in a newer version. Because most software updates involve changes to only a small portion of a software application, a binary patcher needs, in addition to the old software application, only a small data file including the differences between the two versions. The smaller data files distributed for a binary patch update are often less than 1% of the size of a full update, taking advantage of the large amount of redundancy in the two versions.

The use of incremental update methods allows for smaller updates which can be distributed by means that are not conducive to the distribution of full updates, such as distribution over the Internet. The smaller incremental updates also make distribution by floppy disk more feasible where a full update would have required many disks, and an incremental update may require only one. However, incremental update methods introduce another problem: the incremental update is specifically useful for updating only one particular version of a software application to another particular version. When updates occur frequently, as with virus protection software applications, end users may often update from an arbitrarily old version to the newest version, skipping over several previously released versions. An incremental update for the newest version of a software application will update only from the most recent version, however.

One solution to this problem has been for software publishers to group a number of binary patch data files together into one distribution. The user of an arbitrarily old version can then apply each incremental update, one at a time, to update to the newest version. However, the number of incremental updates may be large, due to the fact that the grouping covers a large number of versions. The benefits of smaller distributed update files begin to disappear, as the size of the grouped-together incremental updates grows. This method of updating applications can also be cumbersome, as a series of update patches need to be selected from the group and applied to the software application one after another.

Another solution to the problem of incremental update version-specificity has been to create a unique patch file for transforming every previous version of the application to the most current version. Some users may not wish to update their software applications to the most current version, however, for a number of reasons. Some may be within a corporate setting, where an information services department allows updates only to versions it has had a chance to test and approve. Others may have older computer systems which do not support the increased resource requirements of the newest version of an application. For these reasons, publishers of software updates using this method must generally keep updates available from every previous version of an application to a large number of more recent versions. This results in a geometrically growing number of update patch files to produce, store and maintain for users. In the case of publishers who update their applications frequently, such as publishers of virus-protection software applications, this may quickly become untenable.

One alternative to the methods described above is the use of "push" technology, in which servers maintain databases of what versions of a software application each user has. The servers then send the necessary updates to each user, as they become available. This system requires "smart" servers, however, to monitor user configurations, determine what each user needs, and send the appropriate update information. This results in a server-intensive system which can cause a drain on server resources comparable to that experienced in the full update scheme, when many users are simultaneously requesting full updates.

What is needed is a system for updating software applications from an arbitrary first version to an arbitrary second version which does not require a large amount of information to be stored and maintained by a software publisher, does not require the user to acquire a large amount of data to perform such an update, and does not require the use of "smart" servers.

DISCLOSURE OF INVENTION

The present invention is a method and apparatus for distributing the appropriate incremental software update information to users. A software publisher (118) provides update patches (122) which will update users' software applications (110) from one state to another. The update patches (122) are 'tiered.' Update patches on the first tier (200) update from a given application state to the subsequent application state. Update patches on the second tier (202) update an application from a given state to the state which is two versions later. The tier of an update patch indicates how many individual updates are spanned by the patch.

By selectively providing tiered update patches, software publishers (118) can facilitate quick, efficient updating of users' applications (10) without producing and maintaining large numbers of update patches (122). These update patches (122) may be provided to users simultaneously through a variety of distribution channels (124), since a "smart server" is not necessary to provide users with the needed update patches (122). This allows for selective redundancy, as update patches (122) which are likely to be needed by many users may be made available through more of the available distribution channels (124) than others, providing a robust distribution system.

BRIEF DESCRIPTION OF THE DRAWINGS

These and other more detailed and specific objects and features of the present invention are more fully disclosed in the following specification, reference being had to the accompanying drawings, in which:

FIG. 2 is an illustration of the relation of various tiers of updates to a series of application states in the present invention.

FIG. 3 is an illustration of an example of the use of multi-tiered incremental updates to perform a software application update according to the present invention.

FIG. 4 is an illustration of an example of a sub-optimal software application update using incremental updates.

FIG. 5 is an illustration of an example of a publishing schedule for multi-tiered incremental updates which meets the necessary condition for optimal updates according to the present invention.

FIG. 6 is an illustration of an updating program 126 using a catalog 404 to determine an appropriate sequential set of update packages 412 based on attributes of an application 110.

FIG. 7 is an illustration of an updating program 126 constructing a sorted directory 408 of available catalogs 404 from different sources 400 and 402.

FIGS. 8a and 8b are a flowchart showing how an updating program determines what update patches need to be applied to effect an update, and how the updating program carries out the updating.

DETAILED DESCRIPTION OF THE PREFERRED EMBODIMENTS

In one embodiment, the present invention may be implemented as an update mechanism for a virus protection software application. In other embodiments, the present invention may be used to update general computer readable files, which may include data files, program files, database files, graphics files, or audio files. For illustrative purposes only, the invention will be described as embodied in an update mechanism for virus protection software.

Figure 1:
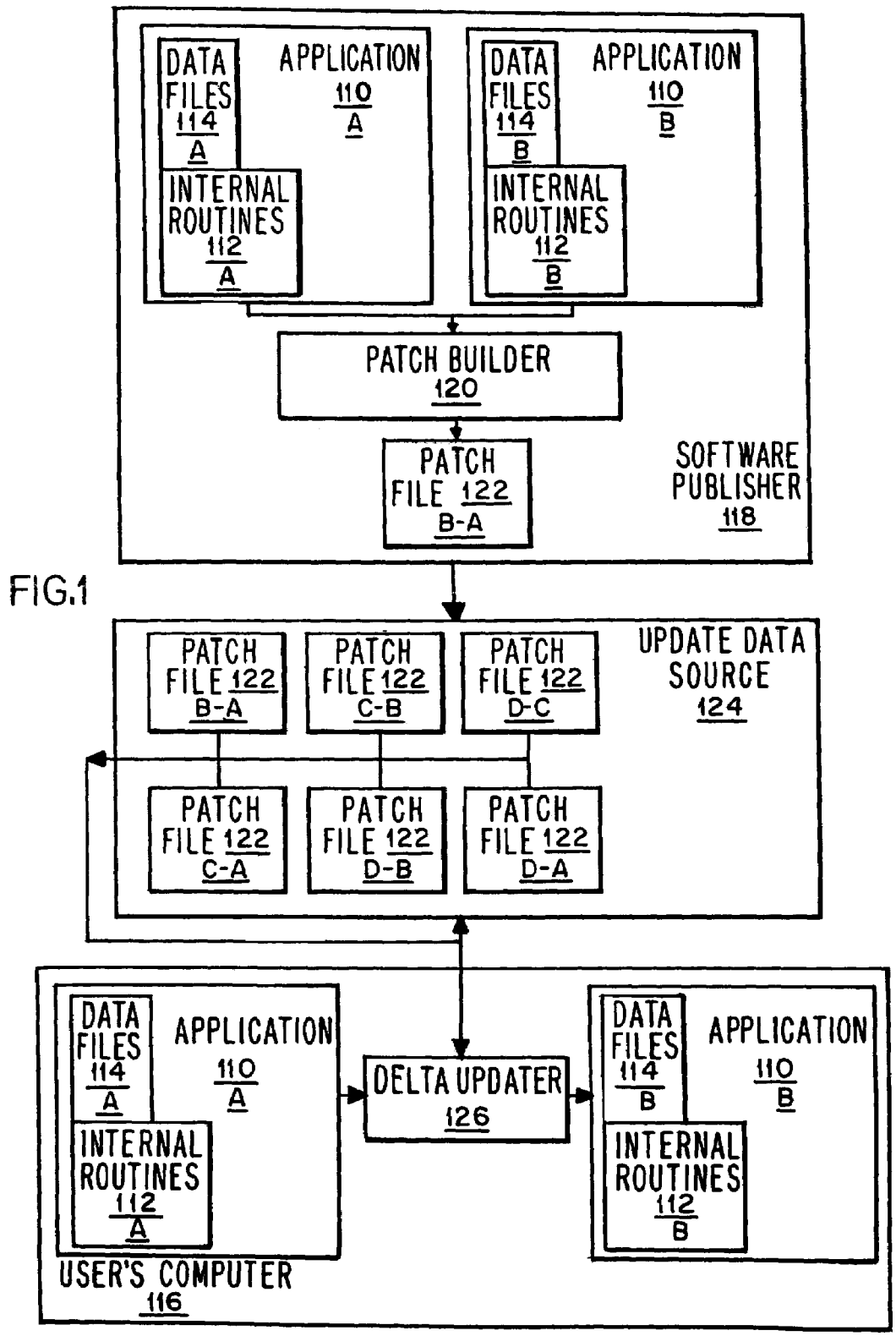
FIG. 1 is a block diagram of a first embodiment of the present invention, in which a software application 110 on a user's computer 116 is updated with incremental update patches 122 from a remote source 1118.

Referring to FIG. 1, a virus protection software application 110 which incorporates a number of virus detecting routines 112, and utilizes a number of data files containing virus information 114, is installed on a user's computer 116. Because of the rate at which new viruses are created, it is desirable to update the virus protection software applications on the user's computer frequently. These updates could take place as often as daily, or even more frequently if desired. Generally, these updated applications 110 will include only small changes to the data files 114, but sometimes larger changes to the virus detecting routines 112 will also be included.

In order to fully describe the embodiment of the present invention, it is first necessary to describe DeltaPackages, DeltaCatalogs, and DeltaDirectories.

DeltaPackages

Each time an updated software application 110 is produced by the virus protection software publisher, the updated form of the software application constitutes a new version. The software publisher uses an incremental update builder, such as binary patch file builder 120, to produce at least one incremental update, such as binary patch file 122, which can transform a previous version of the software application to the current version. A binary patch file builder 120 is a program which takes two versions of a software application, for example versions A and B, and produces a binary patch file, 122, which can be used with version A of the software application to produce version B. In this example, version A would be the "source" state and version B would be the "destination" state of the application. This binary patch file 122 can either be an executable file which acts directly on version A of the software application, or it can be a data file which is used by a separate binary patch program (not shown) to transform version A of the software application to version B. The binary patch files 122 are stored on an update data source 124 (a "server") which makes the patch files 122 available to an updater program 126 (a "client"). The updater program 126 determines what patch files 122 are necessary, retrieves them and applies them to the application to be updated 110. In the illustrative embodiment, the incremental update files are binary patch files which are digitally signed compressed executable modules, and the Java ARchive (JAR) platform-independent file format, available from Sun Microsystems, is used for this purpose. Because they are digitally signed, the authenticity of the updates can be ensured. When executed, the incremental update file automatically transforms a software application from a source state to a destination state. These self-contained executable incremental update files conforming to the JAR format are referred to as "DeltaPackages" 122, and are one example of what is referred to herein as an "update patch".

In FIG. 2, a series of application states are given, designated state A through state S. Each application state is a software application version which is produced by the software publisher later in time than a version with an alphabetically earlier letter designation. The DeltaPackages 122, which are referred to as "tier 1" DeltaPackages 200, are so named because they each effect a transition from an application state which is only one version earlier than the destination state. There is a tier 1 DeltaPackage 200 for updating to each application state other than the initial application state, A. The software publisher may produce higher tier DeltaPackages 122, such as "tier 3" DeltaPackages 202 and "tier 9" DeltaPackages 204. A tier 3 DeltaPackage 202 is used to transform an application from a source state three versions earlier than the destination state, and a tier 9 DeltaPackage 204 is used to transform an application from a source state nine versions earlier than the destination state. Many other tiers of DeltaPackages 122 may be produced, but the benefits of additional tiers must be weighed against the costs, described below. In FIG. 2, tier 1 DeltaPackages 200 are produced for each new version, tier 3 DeltaPackages 202 are produced for every third version, and tier 9 DeltaPackages 204 are produced for every ninth version.

For illustrative purposes, each DeltaPackage 122 is given a designation which is "Δ" followed by two letters. The first letter indicates the application source state upon which the DeltaPackage 122 works and the second letter indicates the application destination state produced. For the case where there are not multiple "flavors" of the application which need to be updated in parallel, a relatively simple process is employed to update the application. DeltaPackages 122 are applied to a user's software application incrementally, beginning with the highest tier DeltaPackage 122 available which has a source state equal to the current state of the application, and a destination state no later than the desired ending state. After the DeltaPackage 122 is applied, and the application is updated to the destination state of the DeltaPackage 122, another DeltaPackage 122 is chosen in the same manner, with the new application state providing the source state of the next DeltaPackage 122. This continues until the desired ending state of the application is reached.

FIG. 3 illustrates this procedure for a case in which it is desired to transform an application of state F to an application of state T. Following the procedure described above, such a transformation is accomplished through only four incremental updates, from F to G to J to S to T. Each time a new DeltaPackage 122 is to be selected, the one chosen is the highest tier DeltaPackage 122 with the current application state as a source state, and a destination state which does not exceed the desired ending state.

When fewer incremental updates are required to perform a given transformation, fewer DeltaPackages 122, and therefore less information, needs to be transferred to the application. The procedure described above produces a desired transformation using the smallest number of available DeltaPackages 122, as long as one condition is met: no available DeltaPackage 122 may have a source state which is between the source and destination states of an available DeltaPackage 122 with a lower tier. As long as this condition is met, then the procedure described above will perform an optimum transformation, using the smallest number of available DeltaPackages 122 to get from the beginning state to the desired ending state. If the condition is not met then the procedure described above may result in a transformation which uses more of the available DeltaPackages 122 than necessary. An example of a sub-optimal transformation is illustrated in FIG. 4. In that case, a transformation from state G to state S uses four DeltaPackages 122 (ΔGJ, ΔJM, ΔMP and ΔPS), when it need only use three (ΔGH, ΔHI, and ΔIS).

Because the ΔIS DeltaPackage 122 has a source state (I) which is between the source and destination states of a lower tier DeltaPackage (ΔGJ), the ΔIS DeltaPackage 122 violates the above condition, and a sub-optimal set of DeltaPackages 122 is used. In practice, a software publisher may easily ensure that the available DeltaPackages 122 meet this condition, since each DeltaPackage 122 is produced later in time than DeltaPackages 122 with earlier destination states. In the above example, before issuing DeltaPackage ΔIS, the publisher would eliminate DeltaPackage ΔGJ and possibly replace it with another, such as DeltaPackage ΔGI.

In the example of FIG. 3, if only the tier 1 DeltaPackages 200 had been available, fourteen DeltaPackages 122 would have been required for the transformation, instead of four, and much unnecessary information would have been transferred to the application. The total number of DeltaPackages 122 which would have been produced by the publisher, however, would have been smaller, the higher tier DeltaPackages 122 not having been produced. On the other hand, if a tier 14 DeltaPackage 122 designated ΔFT had been available, only one DeltaPackage 122 would have been required, and very little information would have been transferred to the user. However, the availability of a DeltaPackage 122 which accomplishes any particular transformation in one step can be assured only by producing individual DeltaPackages 122 from every source state to every destination state, which requires a number of DeltaPackages 122 approaching N! (where N is the number of file states). Producing and maintaining such a large number of individual DeltaPackages 122 is not feasible in many situations, as explained above. These considerations must be considered by a software publisher in determining the most efficient DeltaPackage 122 publishing schedule. For the illustrative embodiment, it was determined that providing DeltaPackages 122 of tiers 1, 3 and 9 would be most efficient.

The tiers of DeltaPackages 122 produced do not need to be published according to any fixed schedule, but rather may be determined as new updates become available. In FIG. 5 an irregular publishing schedule of DeltaPackages 122 is shown. There are four separate tiers of DeltaPackages 122 available with J as a source state. The decision to create so many DeltaPackages 122 with the same source state may be based on the fact that many copies of the application in the J state are known to be at large. Many publisher-specific, application-specific, and information transport mechanism-specific factors will affect the desirability of a publishing schedule for DeltaPackages 122.

DeltaCatalogs

Software publishers often produce different "flavors" of a single software application, directed to different computer architectures, different operating systems, and users who speak different languages. The scheme for publishing incremental updates laid out above is adequate for the case in which there is only one flavor of a software application. For the more general case of several application flavors, however, some additional mechanisms can be used to handle the additional complexities of parallel updating. A system which addresses these complexities is described in the second illustrative embodiment of the present invention.

In the case of virus definition updates, there are often updates which are not operating system-specific, and sometimes there are updates which are not even computer architecture-specific. Other times, updates are specific to these, and other, categories. A single update DeltaPackage 122 may be useful to update some flavors of an application, but not others. To handle these complexities, update catalogs, referred to as "DeltaCatalogs," are utilized. These update catalogs are another example of what are referred to herein as "update patches." Rather than having a single DeltaPackage 122 correspond to each incremental update (i.e. "ΔIS") as above, a DeltaCatalog corresponds to each incremental update (i.e. "ΔIS"). Each DeltaCatalog has an associated source state and an associated destination state, and specifies the necessary update information by specifying which DeltaPackages 122 should be used by each flavor of the application to update from the source state to the destination state. In one embodiment, DeltaPackages 122 are given unique IDs which do not conform to the "ΔAB" format used above for illustrative purposes, and are specified by the DeltaCatalogs using these unique IDs. With DeltaCatalogs substituted for DeltaPackages 122, the general scheme described above is utilized.

There are a number of different ways DeltaCatalogs can be implemented. In this embodiment, the Extensible Markup Language (XML) standard is used to create a document type definition. The XML standard is available from W3C Publications, World Wide Web Consortium, Massachusetts Institute of Technology, Laboratory for Computing Sciences, NE43-356, 545 Technology Square, Cambridge, Mass. 02139. An example document type definition corresponding to the XML standard, referred to as DPML (for DeltaPackage Markup Language), is given in Appendix A. In this document type definition, there are a number of types of entries a DeltaCatalog may contain. These types are Product (the type of software application), Package (a specific DeltaPackage 122), OS (operating system), CPU (computer architecture) and Language (the language spoken by the users of the software application). An entry of any of these types except Package may in turn contain entries of the types Product, Package, OS, CPU or Language. None of the entry types may contain a DeltaCatalog, and the Package must contain an "ID" which corresponds to a specific DeltaPackage 122. Also, the "to", or destination state, data field and the "from", or source state, data field must be given for a DeltaCatalog.

An example of a DeltaCatalog contained in a file written to conform to the XML format is given in Appendix B. In the DeltaCatalog file itself, the document type definition for "DPML" is specified by including a uniform resource locator (URL) pointing to the location of a current specification of the document type definition. Alternatively, the data type definition may be included in the file explicitly. A software application to be updated contains the attributes of current state, Product, OS, CPU, and Language, and has access to the desired ending state of the software application, as described below. In order to determine a sequential set of DeltaPackages 122 which need to be applied to the software application to effect the transformation from the current state to the desired ending state, an updating mechanism, referred to as a "DeltaUpdater" is used. The DeltaUpdater may be a separate program, or may be part of the software application itself. It goes through the same basic procedure outlined above, with DeltaCatalogs taking the place of DeltaPackages 122. The DeltaCatalog of the highest tier available which has a "from" field matching the application's current state and which has a "to" field which does not exceed the ending state is selected by the DeltaUpdater. The DeltaCatalog is then processed, with the DeltaUpdater processing only those sub-entries contained within entries with attributes which match those of the application. An example is illustrated in FIG. 6. The DeltaCatalog 404 contains a simplified form of the information contained in the DeltaCatalog file of Appendix B. Application 110 has the attributes of "NAV version 2.0 running on Windows NT on an alpha computer using North American English." The DeltaUpdater 126 would process only Package ID's "487" and "766," as all other Package entries correspond to different attributes. Those DeltaPackages 122 which correspond to these two IDs would then makeup a sequential set 412 of DeltaPackages 122 to be applied to application 110 in the order they were encountered in DeltaCatalog 404. When applied to application 110, the DeltaPackages 122 of set 412 transform application 110 from state 1 to state 8, the states given in the "from" and "to" fields of DeltaCatalog 404. If the desired ending state were still later than state 8, then this procedure would again be applied to select and process another DeltaCatalog 404, one which has a "from" value of 8.

DeltaDirectories

A number of transfer mechanisms are available to a DeltaUpdater for retrieving DeltaCatalogs and DeltaPackages 122. Among these are the NNTP Usenet server protocol, available from Internic as "Request For Comments 977"; the HTTP protocol, available from Internic as "Request For Comments 1945"; the FTP protocol, available from Internic as "Request For Comments 959"; and direct access to a "file server" using a protocol such as the Universal Naming Convention (UNC). A file server may be, among other things, internal disk media, removable disk media, or a network resource. Other distribution mechanisms are currently available and more will likely be available in the future. All that is required of a transfer mechanism is that the mechanism be able to supply computer readable data upon request. The present invention utilizes so called "dumb media," meaning that the medium supplying the requested information need not interact with the DeltaUpdater beyond simply supplying requested data. Specifically, "smart servers," such as those used in "push" technology, are not necessary. A smart server determines what update information is necessary, given information about the state of the software application, and then supplies that information. The described transfer mechanisms allow DeltaCatalogs and DeltaPackages 122 to be retrieved from "catalog sources" and "update data sources" on which they are stored.

A typical system embodying the present invention will have available more than one of the mentioned transfer mechanisms, as illustrated in FIG. 7. A DeltaUpdater 126 will have access to a list 403 of locations, specified as URLs, where needed data may be found. In general, these URLs will specify a number of NNTP news-servers with newsgroups, HTTP servers with directory paths, FTP servers with directory paths, and file servers with directory paths. In the embodiment illustrated in FIG. 7, an NNTP server 400 and a file server 402 contain available DeltaCatalogs 404.

Figure 8B:
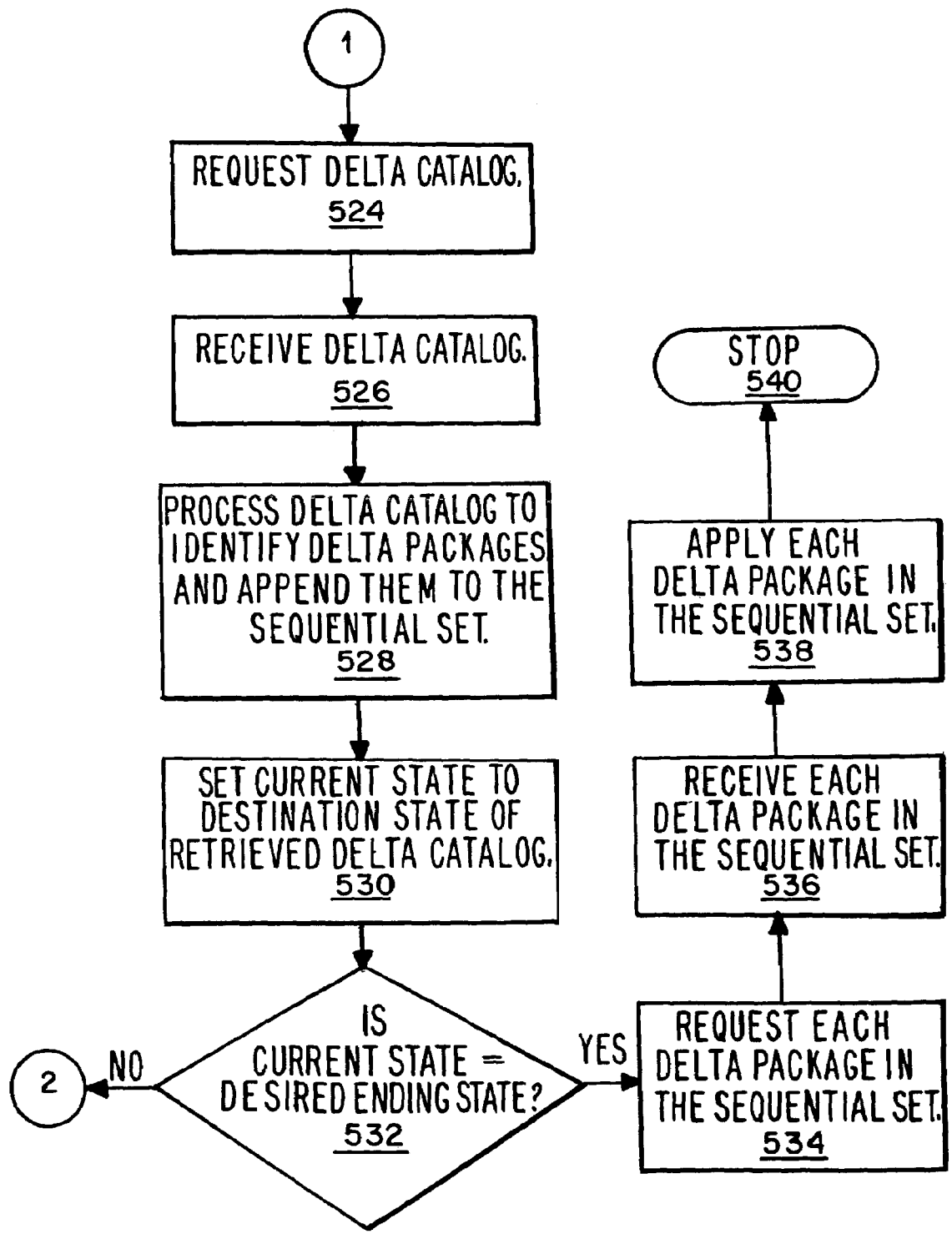

The flowchart of FIG. 8 shows the steps carried out by the DeltaUpdater 126. When an update process is begun, the locations specified in list 403 will be polled 502 in order until one is found which contains the required DeltaCatalogs 404. The DeltaUpdater 126 builds a "DeltaDirectory" 408, which is a list of available DeltaCatalogs 404 at the specified location. For transfer mechanisms which support querying of a file directory, such as HTTP, FTP and file servers, the DeltaDirectory 408 is constructed with the information returned by such queries. For these transfer mechanisms, the DeltaCatalog 404 source and destination state information is contained in the name of each DeltaCatalog file. DeltaCatalogs 404 are named according to a scheme where the first four characters specify a source state, the next four characters specify a destination state, and the file extension is "cat." For NNTP, the DeltaUpdater 126 retrieves headers for available messages, and looks for DeltaCatalog information in the headers. The DeltaCatalog information specifies that the message is a DeltaCatalog 404, and specifies the source and destination states are for the DeltaCatalog 404.

After retrieving the source state and destination state for each available DeltaCatalog 404, the DeltaUpdater 126 organizes this information in the DeltaDirectory 408 by sorting 504 the DeltaCatalogs 404 first by source state, and next by reverse destination state. The DeltaCatalogs 404 of the preferred transport mechanism are used, if possible. Otherwise, DeltaCatalogs 404 of alternate transport mechanisms are used. This ordering of the DeltaCatalog 404 information allows the DeltaUpdater 126 to move through the DeltaDirectory 408 efficiently, finding the URL of each DeltaCatalog 404 with the necessary source state, and the farthest destination state which does not exceed the desired ending state. The DeltaUpdater 126 determines 506 the current state of the application to be updated, and the desired ending state of the application. The application can supply its current state to the DeltaUpdater 126, but the DeltaUpdater 126 needs other information to determine the desired ending state. The method by which the DeltaUpdater 126 determines the desire ending state of the application is addressed below.

The sequential set 412 of DeltaPackages 122 is cleared out 508, in preparation for the determination of the set 412. The DeltaUpdater 126 moves through the DeltaDirectory 408 sequentially in the loop comprising steps 510, 512, and 514 to find the first DeltaCatalog 404 in the DeltaDirectory 408 which has the current state as a source state. The DeltaUpdater 126 then moves through the DeltaDirectory 408 from this DeltaCatalog 404 to find the DeltaCatalog 404 which has the farthest destination state which is not beyond the desired ending state (loop 516, 518, and 520). If all of the DeltaCatalogs 404 which have the current state as a source state have a destination state which is beyond the desired ending state, then the update will fail (step 522).

When a DeltaCatalog 404 is identified at 516 which has a destination state which is not beyond the desired ending state, the DeltaCatalog 404 is requested 524 from the appropriate source 400 or 402. After the requested DeltaCatalog 404 is received 526, the DeltaCatalog 404 is processed 528, as described above, to determine an incremental set of DeltaPackages 122 which are appended to the sequential set 412. The current state of the application is then set 530 to the destination state of this DeltaCatalog 404, and if that state is not the desired ending state 532 the processing continues at step 514, and another DeltaCatalog 404 is determined.

When the full sequential set of DeltaPackages 122 necessary for an update are determined 532, the DeltaUpdater 126 requests 534 each needed DeltaPackage 122. The DeltaUpdater 126 receives 536 the requested DeltaPackages 122 using the appropriate protocol, then uses the digital signature to verify that the DeltaPackages 122 are authentic and have not been altered. Each DeltaPackage 122 retrieved is executed in sequence 538, transforming the application from the beginning state to the desired ending state, and the method stops at step 540. In other embodiments, the DeltaUpdater 126 retrieves all of the DeltaPackages 122 specified by a DeltaCatalog 404 before moving on to the next DeltaCatalog 404.

DeltaDirectives

The beginning state of an application update is determined by the DeltaUpdater with reference to the application itself, which will carry some designation of the current state. The desired ending state, however, is not necessarily as easy to identify. One possibility would be for the DeltaUpdater to simply update the application to the latest state for which DeltaCatalogs are available. In many situations, however, it may not be desirable to the user of a software application to update the application to the latest available state. For example, in corporate settings, Information Services departments may wish to test out and verify the stability of a version of a software application before allowing the applications owned by the corporation to be updated to that version. This is often the case when the update is a major revision. Also, some networked computer systems may require that all copies of a particular application be at exactly the same state. One solution would be for an Information Services department to control the availability of DeltaCatalogs 404. Alternatively, it is desirable in some situations to utilize "DeltaDirectives," which are issued in connection with a given computer or network, specifying to which destination state an update is allowed. A DeltaDirective is a file or NNTP message containing a single value, the allowed destination state. The filename or NNTP message header identifies the file or NNTP message as a DeltaDirective. The location for such DeltaDirectives is made available to the DeltaUpdater before the update procedure is begun. As illustrated in FIG. 7, the DeltaUpdater 126 identifies the latest available DeltaDirective 405 in the prescribed location, obtains the DeltaDirective 405, and reads the desired ending state from it. This desired ending state is used by the DeltaUpdater 126 in steps 506, 516, and 532 of FIG. 8. The publisher of the updates may make available general DeltaDirectives 405 which specify the latest available state. The DeltaUpdater for any given computer may be set to look to the DeltaDirectives 405 issued by the software publisher or those issued by some other authority, such as an Information Services department.

The above description is included to illustrate the operation of the preferred embodiments and is not meant to limit the scope of the invention. The scope of the invention is to be limited only by the following claims. From the above description, many variations will be apparent to one skilled in the art that would yet be encompassed by the spirit and scope of the present invention.

The invention claimed is:

1. A method for publishing update information for a computer readable file associated with a sequence of states, the method comprising:

creating at least two update patches, such that each update patch has a first state and a second state associated therewith, the first state and the second state of each update patch being states within the sequence of states, the first state of each update patch preceding in the sequence of states the second state of that update patch, and each update patch specifying information about differences between the first state and the second state; and storing the update patches such that each update patch is accessible to at least one update data source, where each update data source is disposed to receive a request associated with one of the update patches and transmit the requested update patch over a computer network;

wherein:

the computer readable file comprises a virus protection software application.

2. The method of claim 1 wherein the virus protection software application comprises a virus detecting routine.

3. The method of claim 1 wherein the virus protection software application comprises virus signature information.

4. A method for publishing update information for a computer readable file associated with a sequence of states, the method comprising:

creating at least two update patches, such that each update patch has a first state and a second state associated therewith, the first state and the second state of each update patch being states within the sequence of states, the first state of each update patch preceding in the sequence of states the second state of that update patch, and each update patch specifying information about differences between the first state and the second state; and storing the update patches such that each update patch is accessible to at least one update data source, where each update data source is disposed to receive a request associated with one of the update patches and transmit the requested update patch over a computer network; wherein:

the computer readable file is a file from the group of files comprising:
  a data file;
  a program file;
  a database file;
  a graphics file;
  an audio file;
  a video file.

5. A method for creating update information for a computer readable file associated with a sequence of states, the method comprising:

creating at least two update patches, such that each update patch has a first state and a second state associated therewith, the first state and the second state of each update patch being states within the sequence of states, the first state of each update patch preceding in the sequence of states the second state of that update patch, and each update patch specifying information about differences between the first state and the second state; wherein:

each update patch has a tier associated therewith, the tier being a positive integer that corresponds to the number of states between the first state and the second state associated with that update patch; and at least one of the update patches has a tier that is different from the tier of another update patch; wherein:

for each update patch having a tier greater than one, there exists a sequential plurality of unitary update patches each having a tier of one, such that the update patch having a tier greater than one and the sequential plurality of unitary update patches have the same overall beginning state and the same overall ending state, and the update patch having a tier greater than one contains fewer bits than the agglomerated sequential plurality of unitary update patches; wherein:

the computer readable file comprises a virus protection software application.

6. The method of claim 5 wherein the virus protection software application comprises a virus detecting routine.

7. The method of claim 5 wherein the virus protection software application comprises virus signature information.

8. A method for creating update information for a computer readable file associated with a sequence of states, the method comprising:

creating at least two update patches, such that each update patch has a first state and a second state associated therewith, the first state and the second state of each update patch being states within the sequence of states, the first state of each update patch preceding in the sequence of states the second state of that update patch, and each update patch specifying information about differences between the first state and the second state; wherein:

each update patch has a tier associated therewith, the tier being a positive integer that corresponds to the number of states between the first state and the second state associated with that update patch; and at least one of the update patches has a tier that is different from the tier of another update patch; wherein:

for each update patch having a tier greater than one, there exists a sequential plurality of unitary update patches each having a tier of one, such that the update patch having a tier greater than one and the sequential plurality of unitary update patches have the same overall beginning state and the same overall ending state, and the update patch having a tier greater than one contains fewer bits than the agglomerated sequential plurality of unitary update patches; wherein:

the computer readable file is a file from the group of files comprising:
  a data file;
  a program file;
  a database file;
  a graphics file;
  an audio file;
  a video file.

9. A method for creating update information for a computer readable file associated with a sequence of states, the method comprising:

creating at least two update patches, such that each update patch has a first state and a second state associated therewith, the first state and the second state of each update patch being states within the sequence of states, the first state of each update patch preceding in the sequence of states the second state of that update patch, and each update patch specifying information about differences between the first state and the second state; and creating at least two catalogs, each catalog specifying at least one update patch; wherein:

a catalog contains information pertaining to flavor of the computer readable file; and flavor consists of at least one characteristic from the group of characteristics comprising computer architecture with which the computer readable file can be used, operating system with which the computer readable file can be used, and natural language with which the computer readable file communicates to users; wherein:

the computer readable file comprises a virus protection software application.

10. The method of claim 9 wherein the virus protection software application comprises a virus detecting routine.

11. The method of claim 9 wherein the virus protection software application comprises virus signature information.

12. A method for creating update information for a computer readable file associated with a sequence of states, the method comprising:
  creating at least two update patches, such that each update patch has a first state and a second state associated therewith, the first state and the second state of each update patch being states within the sequence of states, the first state of each update patch preceding in the sequence of states the second state of that update patch, and each update patch specifying information about differences between the first state and the second state; and
  creating at least two catalogs, each catalog specifying at least one update patch; wherein:
  a catalog contains information pertaining to flavor of the computer readable file; and
  flavor consists of at least one characteristic from the group of characteristics comprising computer architecture with which the computer readable file can be used, operating system with which the computer readable file can be used, and natural language with which the computer readable file communicates to users; wherein:
  the computer readable file is a file from the group of files comprising:
    a data file;
    a program file;
    a database file;
    a graphics file;
    an audio file;
    a video file.

13. A computer-readable medium containing computer program instructions for publishing update information for a computer readable file associated with a sequence of states, said computer program instructions performing the steps of:
  creating at least two updates, such that each update has a first state and a second state associated therewith, the first state and the second state of each update being states within the sequence of states, the first state of each update preceding in the sequence of states the second state of that update, and each update specifying information about differences between the first state and the second state; and
  storing the updates such that each update patch is accessible to at least one update data source, where each update data source is disposed to receive a request associated with one of the updates and transmit the requested update over a computer network; wherein:
  the computer readable file comprises a virus protection software application.

14. The computer-readable medium of claim 13 wherein the virus protection software application comprises a virus detecting routine.

15. The computer-readable medium of claim 13 wherein the virus protection software application comprises virus signature information.

16. A computer-readable medium containing computer program instructions for publishing update information for a computer readable file associated with a sequence of states, said computer program instructions performing the steps of:
  creating at least two updates, such that each update has a first state and a second state associated therewith, the first state and the second state of each update being states within the sequence of states, the first state of each update preceding in the sequence of states the second state of that update, and each update specifying information about differences between the first state and the second state; and
  storing the updates such that each update is accessible to at least one update data source, where each update data source is disposed to receive a request associated with one of the updates and transmit the requested update over a computer network; wherein:
  the computer readable file is a file from the group of files comprising:
    a data file;
    a program file;
    a database file;
    a graphics file;
    an audio file;
    a video file.

17. A computer-readable medium containing computer program instructions for creating update information for a computer readable file associated with a sequence of states, said computer program instructions performing the steps of:
  creating at least two updates, such that each update has a first state and a second state associated therewith, the first state and the second state of each update being states within the sequence of states, the first state of each update preceding in the sequence of states the second state of that update, and each update specifying information about differences between the first state and the second state; wherein:
  each update has a tier associated therewith, the tier being a positive integer that corresponds to the number of states between the first state and the second state associated with that update; and
  at least one of the updates has a tier that is different from the tier of another update; wherein:
  for each update having a tier greater than one, there exists a sequential plurality of unitary updates each having a tier of one, such that the update having a tier greater than one and the sequential plurality of unitary updates have the same overall beginning state and the same overall ending state, and the update having a tier greater than one contains fewer bits than the agglomerated sequential plurality of unitary updates; wherein:
  the computer readable file comprises a virus protection software application.

18. The computer-readable medium of claim 17 wherein the virus protection software application comprises a virus detecting routine.

19. The computer-readable medium of claim 17 wherein the virus protection software application comprises virus signature information.

20. A computer-readable medium containing computer program instructions for creating update information for a computer readable file associated with a sequence of states, said computer program instructions performing the steps of:
  creating at least two updates, such that each update has a first state and a second state associated therewith, the first state and the second state of each update being states within the sequence of states, the first state of each update preceding in the sequence of states the second state of that update, and each update specifying information about differences between the first state and the second state; wherein:
  each update has a tier associated therewith, the tier being a positive integer that corresponds to the number of states between the first state and the second state associated with that update; and at least one of the updates has a tier that is different from the tier of another update; wherein:

for each update having a tier greater than one, there exists a sequential plurality of unitary updates each having a tier of one, such that the update having a tier greater than one and the sequential plurality of unitary updates have the same overall beginning state and the same overall ending state, and the update having a tier greater than one contains fewer bits than the agglomerated sequential plurality of unitary updates; wherein:

the computer readable file is a file from the group of files comprising:
- a data file;
- a program file;
- a database file;
- a graphics file;
- an audio file;
- a video file.

21. A computer-readable medium containing computer program instructions for creating update information for a computer readable file associated with a sequence of states, said computer program instructions performing the steps of:

creating at least two updates, such that each update has a first state and a second state associated therewith, the first state and the second state of each update being states within the sequence of states, the first state of each update preceding in the sequence of states the second state of that update, and each update specifying information about differences between the first state and the second state; and creating at least two catalogs, each catalog specifying at least one update; wherein:

a catalog contains information pertaining to flavor of the computer readable file; and flavor consists of at least one characteristic from the group of characteristics comprising computer architecture with which the computer readable file can be used, operating system with which the computer readable file can be used, and natural language with which the computer readable file communicates to users; wherein:

the computer readable file comprises a virus protection software application.

22. The computer-readable medium of claim 21 wherein the virus protection software application comprises a virus detecting routine.

23. The computer-readable medium of claim 21 wherein the virus protection software application comprises virus signature information.

24. A computer-readable medium containing computer program instructions for creating update information for a computer readable file associated with a sequence of states, said computer program instructions performing the steps of:

creating at least two updates, such that each update has a first state and a second state associated therewith, the first state and the second state of each update being states within the sequence of states, the first state of each update preceding in the sequence of states the second state of that update, and each update specifying information about differences between the first state and the second state; and creating at least two catalogs, each catalog specifying at least one update; wherein:

a catalog contains information pertaining to flavor of the computer readable file; and flavor consists of at least one characteristic from the group of characteristics comprising computer architecture with which the computer readable file can be used, operating system with which the computer readable file can be used, and natural language with which the computer readable file communicates to users; wherein:

the computer readable file is a file from the group of files comprising:
- a data file;
- a program file;
- a database file;
- a graphics file;
- an audio file;
- a video file.

* * * * *